US006942241B2

(12) United States Patent
Yamamura et al.

(10) Patent No.: US 6,942,241 B2
(45) Date of Patent: Sep. 13, 2005

(54) OCCUPANT PROTECTIVE ARRANGEMENT AND A VEHICLE THEREWITH

(75) Inventors: Daisuke Yamamura, Okazaki (JP); Noritaka Nagayama, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 172 days.

(21) Appl. No.: 10/402,850

(22) Filed: Mar. 28, 2003

(65) Prior Publication Data

US 2004/0000776 A1 Jan. 1, 2004

(30) Foreign Application Priority Data

Mar. 28, 2002 (JP) ....................................... 2002-092014

(51) Int. Cl.[7] .......................... B60R 21/20; B60R 21/22
(52) U.S. Cl. ................................. 280/728.2; 280/730.2
(58) Field of Search ............................ 280/730.2, 728.2

(56) References Cited

U.S. PATENT DOCUMENTS 5,265,903 A * 11/1993 Kuretake et al. ........ 280/730.2
5,540,459 A * 7/1996 Daniel ..................... 280/730.2
6,152,482 A * 11/2000 Patel et al. .............. 280/730.2
6,254,123 B1 7/2001 Urushi et al.
6,340,171 B1 * 1/2002 Hirth et al. .............. 280/730.2
2003/0205887 A1 * 11/2003 Wallner et al. .......... 280/730.2

FOREIGN PATENT DOCUMENTS

JP 2000-168482 A 6/2000

* cited by examiner

*Primary Examiner*—Ruth Ilan
(74) *Attorney, Agent, or Firm*—Rossi, Kimms & McDowell, LLP

(57) ABSTRACT

A vehicle has an occupant protective arrangement, which a bracket. The bracket has a holding part that holds an airbag on a pillar panel and a mounting part that is mounted on the pillar panel. The mounting part is located below the lower end of a side roof panel, and the airbag is positioned above the bracket mounting part. With this arrangement, it is possible to inflate the airbag in a reliable manner while preventing the pillar trim and the airbag from interfering with each other.

12 Claims, 3 Drawing Sheets

OCCUPANT PROTECTIVE ARRANGEMENT AND A VEHICLE THEREWITH

CROSS-REFERENCE TO THE RELATED APPLICATION

The disclosure of priority Application No.2002-92014 filed in Japan on Mar. 28, 2002, on which a priority is claimed under 35 U.S.C. § 119(a), in its entirety, including the drawings, claims, and the specification thereof, is incorporated herein by reference.

BACKGROUND

Driver/passenger-side airbags have been widely used as protective equipment in automobiles for protecting the occupant(s). In addition to front airbags, an airbag deployed on the side of a vehicle compartment are also being used. For example, a so-called curtain deployed to extend between a front pillar 11 and a rear pillar 13, as shown in FIG. 3, and a so-called side airbag provided on the side of a vehicle compartment have been developed and put into practical use.

Such a curtain airbag (hereinafter simply referred to as "airbag ") 1 is comprised of an airbag main body 2 stored in the vicinity of a side roof rail (or a side roof panel) 12, along the longitudinal direction of the vehicle. When a high impact is applied to a side of the vehicle, such as during collision or the like, the airbag main body 2 is inflated to cover the overall side of the vehicle compartment to alleviate the impact on an occupant (more particularly, the impact on the head of an occupant).

A brief description will now be given of the mounting structure of the conventional airbag 1 with reference to FIGS. 4 and 5. FIG. 4 is a schematic side view showing a vehicle body 20 of an automobile, and FIG. 5 is a sectional view taken along line V—V of FIG. 4. As shown in FIG. 5, a center pillar 10 is comprised of an outer panel 10*a* disposed on the outer side of the vehicle and an inner panel 10*b* disposed on the inner side of the vehicle, and the edges (not shown) of the panels 10*a* and 10*b*, which edges extend in the longitudinal direction of the vehicle, welded to each other. In the upper part of the center pillar 10, the upper end of the outer panel 10*a* and a vehicle outer-side edge portion 12*a* of the side roof rail 12 are lapped one over the other and joined together, and the upper end of the inner panel 10*b* and a vehicle inner-side edge portion 12*b* of the side roof rail 12 are lapped one over the other and joined together. Further, a pillar trim 14 is disposed on the vehicle compartment inner side of the inner panel 10*b* in such a manner as to cover a vehicle compartment inner-side surface of the inner panel 10*b*. Further, the upper end of the pillar trim 14 is connected to a head lining 15.

The airbag main body 2 is disposed in a space between the pillar trim 14 and the inner panel 10*b*. As shown in FIG. 5, the airbag main body 2 is fastened on the inner panel 10*b* via a bracket 3 with a bolt 16 or the like. The bracket 3 is formed with a protrusion 31 extending substantially downward, and an engagement portion 14*a*, which is integrated with the pillar trim 14, is abutted against the protrusion 31. The airbag main body 2 is usually folded into a fan or accordion shape, or wound into a cylindrical shape.

A brief description will now be given of the operation of the curtain airbag 1 mounted as described above. First, in response to a side collision, the airbag main body 2 starts inflating to spread into the vehicle compartment from the space between the center pillar 10 and the pillar trim 14. Due to the impact of the side collision, the inner panel 10*b* of the center pillar 10 moves inwardly in the vehicle compartment as indicated by the arrow ① in FIG. 5. Since the center trim 14 is fixed to the inner panel 10*b*, the pillar trim 14 moves inwardly in the vehicle compartment with the movement of the inner panel 10*b* (as indicated by two-dot dash lines in FIG. 5).

As shown in FIG. 5, the airbag main body 2 is fastened on a point P in the upper part of the inner panel 10*b* and in the vicinity of the joint of the inner panel 10*b* and the side roof rail 12. As the point P has a relatively high stiffness, it is deformed to a relatively small degree even in the event of a side collision. Thus, the airbag main body 2 moves to a smaller degree as compared with the inner pillar 10*b* and the pillar trim 14. Therefore, the pillar trim 14 is likely to enter the inflating range of the airbag 1 in the event of a side collision, and the spreading airbag 1 can interfere with the pillar trim 14 to inhibit the airbag 1 from inflating in an ideal manner. In this respect, the engagement part 14*a* is designed to prevent the pillar trim 14 from entering into the inflating range of the airbag 1. That is, in the event of a side collision, the engagement part 14*a*, which is engaged with the protrusion 31 of the bracket 3, is designed to suppress the relative displacement of the airbag main body 2 and the pillar trim 14, thus preventing the pillar trim 14 from entering into the inflating range of the airbag 1.

According to the above described prior art, the engagement part 14*a* is required to have a high stiffness so as to inhibit the pillar trim 14 from entering into the inflating range of the airbag 1. Since the pillar trim 14 is ordinarily made of resin, however, it is difficult to provide the engagement part 14*a* with a high stiffness. Therefore, the prior art requires an additional L-shaped plate part to the engagement part 14*a*, and thus has the problem of increasing the number of parts and the weight. Incidentally, the related arts are also disclosed in Japanese Laid-Open Patent Publication (Kokai) No. 2000-168482 and Japanese Laid-Open Patent Publication (Kokai) No. 2000-33845. According to the related arts disclosed in these publications, as is the case with the above described prior art, a bracket for holding an airbag is fixed to a part in the upper part of a center pillar and in the vicinity of a side roof rail, and thus, it is impossible tom solve the above-mentioned problem.

Accordingly, there is a need to provide an occupant protective apparatus or arrangement that is simple in design and yet prevents a pillar trim from interfering with the airbag operation, thus enabling the airbag to inflate in a reliable manner. The present invention address this need.

SUMMARY OF THE INVENTION

The present invention relates to an occupant protective arrangement for a vehicle, and a vehicle having such an arrangement.

One aspect of the present invention is an occupant protective arrangement for a vehicle. The arrangement includes a side roof panel or a first side member, a pillar panel or second side member, a pillar trim or third side member, and an airbag.

The side roof panel or first side member can constitute an upper part of a side of a vehicle body. The pillar panel or second side member can extend below the side roof panel or first side member. The pillar trim or third side member can cover the pillar trim or second side member.

The pillar panel or second side member can be less stiff than the side roof panel or first side member. The pillar trim or third side member can be disposed farther inwardly in the vehicle compartment than the pillar panel or second side member, and can be fixed thereto.

The airbag inflates and spreads into the vehicle compartment, and can be fixed to the pillar panel or second side member. The airbag can be disposed above the pillar trim or third side member. Moreover, the airbag can be disposed farther inwardly in the vehicle compartment than the pillar trim or third side member and located above the pillar trim or third side member. More specifically, the airbag can be disposed farther inwardly in the vehicle compartment than an upper end of the pillar trim or third side member. More specifically, an outer-side surface of the airbag can be disposed farther inwardly in the vehicle compartment than an inner-side surface of the upper end of the pillar trim or third side member.

The airbag can be fixed to the pillar panel or second side member, such that a relative positional relation between the airbag and the pillar trim or third side member is substantially maintained while the pillar panel or second side member is deformed inwardly in the vehicle compartment. In this respect, the arrangement can further include a bracket having a holding part for holding the airbag and a mounting part for mounting to the pillar panel or second side member. The mounting part can be positioned below the lower end of the side roof panel or first side member. Moreover, the mounting part can be mounted so that the airbag is maintained above the mounting part.

One end of the pillar panel or second side member can comprise an overlapping part that overlaps the side roof panel or first side member, and a lower end edge of said side roof panel or first side member can be located below the overlapping part. The pillar panel or first side member can comprise an outer pillar panel disposed on an outer side of the vehicle compartment and an inner pillar panel disposed on an inner side of the vehicle compartment. The bracket can be mounted to the inner pillar panel.

Another aspect of the present invention is a vehicle having the above-described features.

BRIEF DESCRIPTION OF THE DRAWINGS

The nature of this invention, as well as other objects and advantages thereof, will be explained in the following with reference to the accompanying drawings, in which like reference characters designate the same or similar parts throughout the following figures.

DETAILED DESCRIPTION

Figure 1:
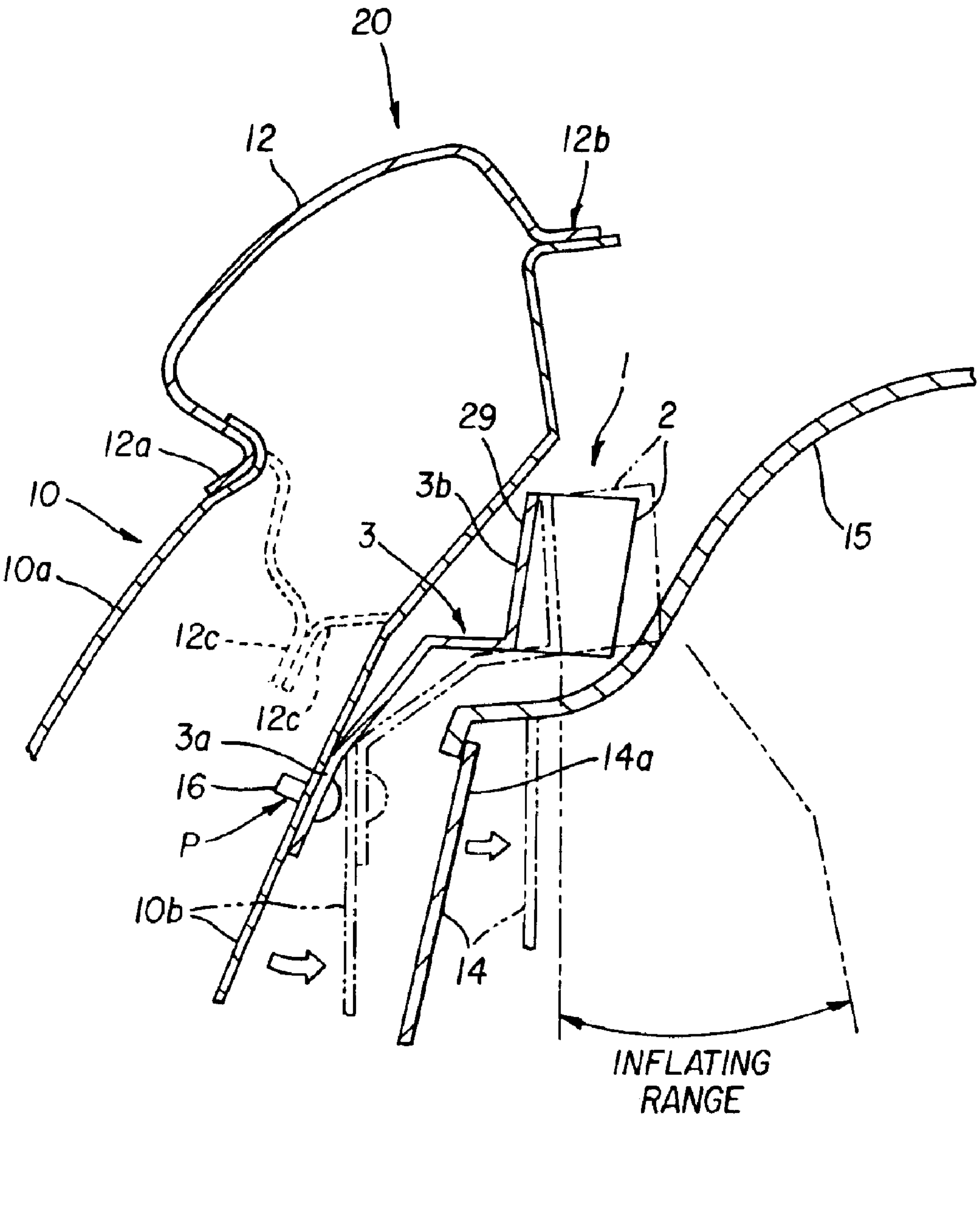
FIG. 1 is a schematic sectional view showing the construction of the basic components of an occupant protective apparatus or arrangement for a vehicle according to an embodiment of the present invention.
Figure 2:
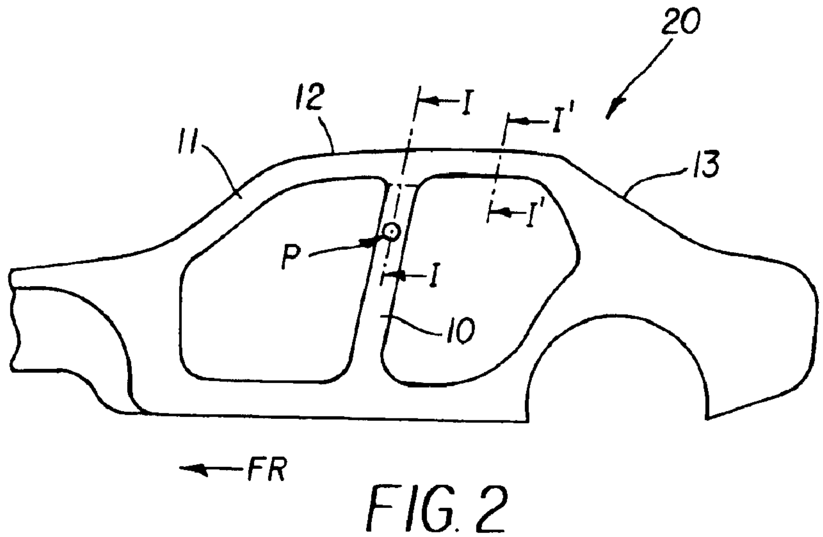
FIG. 2 is a schematic side view showing a vehicle body to which is applied the occupant protective apparatus or arrangement for the vehicle according to the embodiment.

A detailed description of an embodiment of an occupant protective arrangement for a vehicle according to the present invention follows with reference to the accompanying drawings. FIG. 1 is a schematic sectional view showing the basic components of the occupant protective arrangement according to the embodiment of the present invention, and FIG. 2 is a side view showing a vehicle body to which is applied the occupant protective arrangement shown in FIG. 1. Note that FIG. 1 mainly illustrates a section taken along I—I of FIG. 2, but also partially illustrates a section taken along I'—I' of FIG. 2 in phantom.

As shown in FIG. 1, a center pillar 10 is comprised of an outer panel (outer pillar panel) 10*a* disposed on the outer side of a vehicle and an inner panel (inner pillar panel) 10*b* disposed on the inner side of the vehicle. The edges (not shown) of the panels 10*a* and 10*b* in the longitudinal direction of the vehicle are welded to each other. In the upper part of the center pillar 10, the upper end of the outer panel 10*a* and a vehicle outer-side edge portion 12*a* of a side roof rail (side roof panel) 12 are lapped one over the other and joined together, and the upper end of the inner panel (pillar panel) 10*b* and a vehicle inner-side edge portion 12*b* of the side roof rail 12 are lapped one over the other and joined together. A pillar trim 14 is fixed to the vehicle compartment inner side of the inner panel 10*b* by means of a clip (not shown) in such a manner as to cover the inner panel 10*b*. Further, the upper end of the pillar trim 14 is connected to a head lining 15.

Figure 3:
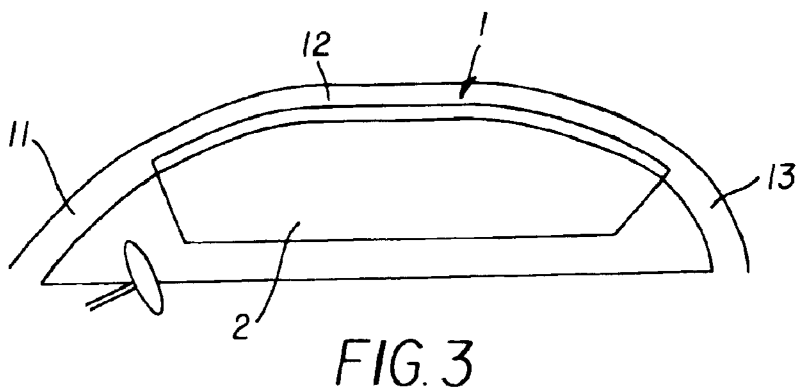
FIG. 3 is a view illustrating a conventional curtain airbag.
Figure 4:
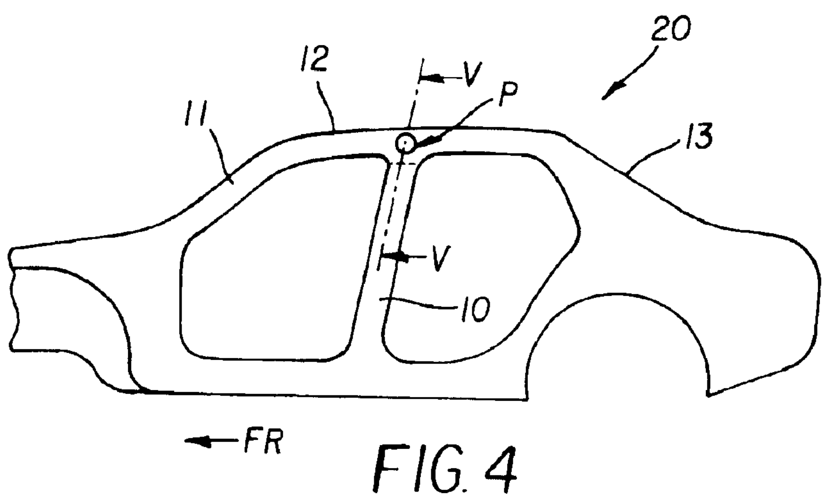
FIG. 4 is a schematic side view showing a vehicle provided with the conventional curtain airbag.
Figure 5:
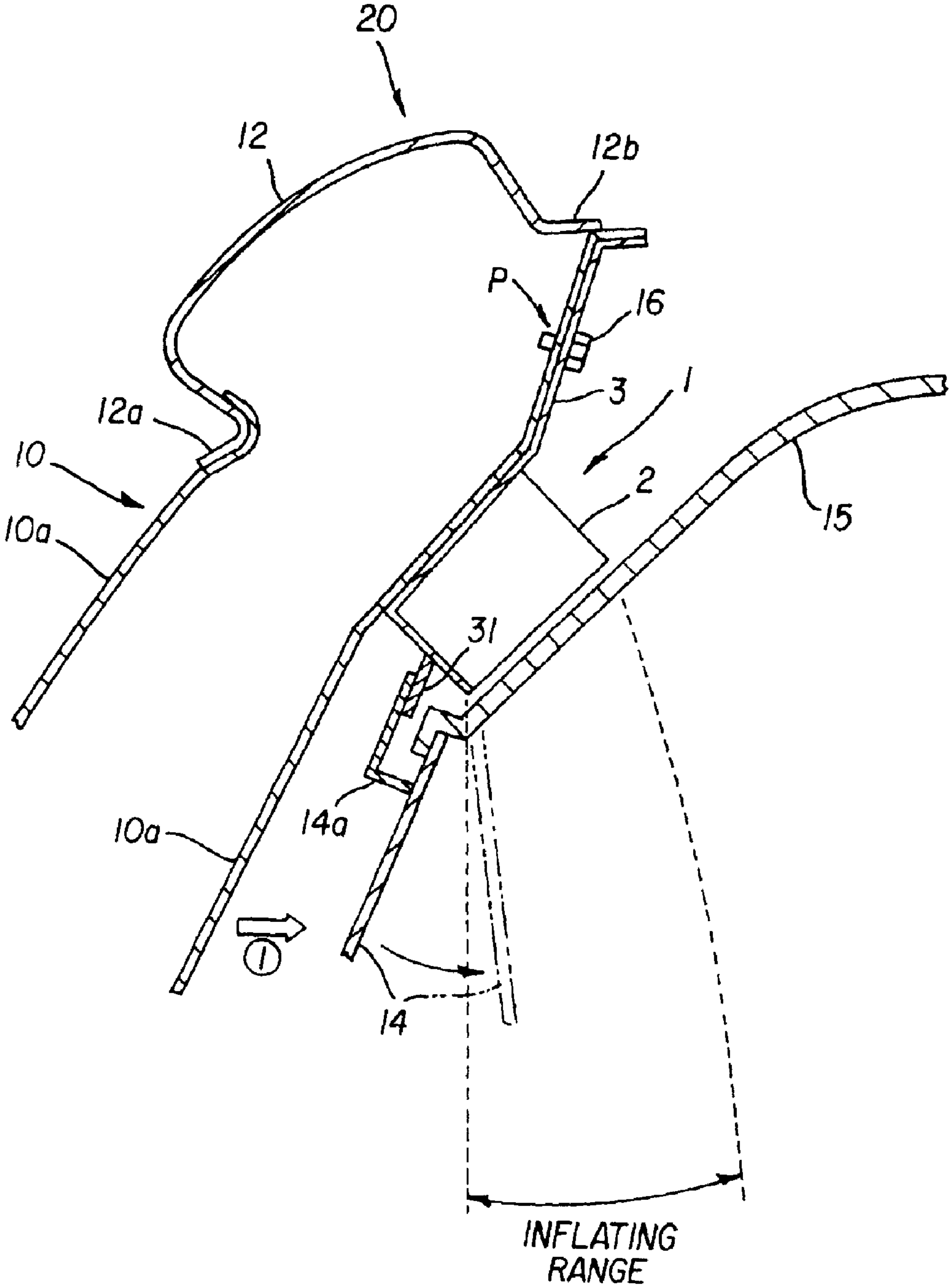
FIG. 5 is a schematic sectional view taken along line V—V of FIG. 4 and useful in explaining the prior art.

An airbag 1 having an airbag main body 2 is disposed in a space between the head lining 15 and the inner panel 10*b*. The airbag 1 used in this embodiment is a so-called curtain airbag that extends between the front pillar 11 and the rear pillar 13 when deployed. Other airbag types also can be used. When a high impact is applied to a side of the vehicle due to a collision or the like, the airbag 1 is inflated to spread out from the upper part of the side of the vehicle in such a manner as to cover the overall inner side face of a vehicle compartment as shown in FIG. 3. It should be noted that the side roof rail 12 and the upper part of the inner panel 10*b* constitute a first side member, the outer panel 10*a* and a part of the inner panel 10*b* continuing downwardly from the first side member constitute a second side member with a lower stiffness than the first side member, and the pillar trim 14 fixed to the vehicle compartment inner side of the inner panel 10*b* constitutes a third side member.

As shown in FIG. 1, an airbag 1 or its main body 2 is fastened on the inner panel 10*b* via a bracket 3 by means of a bolt 16 or the like. The occupant protective apparatus or arrangement for the vehicle according to the present invention greatly differs from the prior art in that a point P where the bracket 3 holding the airbag main body 2 is mounted on the inner panel 10*b* is below the airbag, and is lower than that of the prior art. Moreover, the airbag main body 2 is disposed farther inwardly in the vehicle compartment than the upper end of the pillar trim 14 as shown in FIG. 1. Specifically, the bracket 3 is comprised of a mounting part 3*a* that is fixed to a vehicle body 20, and a holding part 3*b* that holds the airbag main body 2. The mounting part 3*a* extends downwardly below the airbag main body 2 and mounted to the inner panel 10*b* as shown in FIG. 1.

The point P where the mounting part 3*a* is mounted to the inner panel 10*b* is not set in the vicinity of the side roof rail 12, but is set on the center pillar 10 constituting the second side member below the side roof rail 12 as shown in FIGS. 1 and 2. This is because the pillar trim 14 moves together with the center pillar 10 in the event of a side collision. By fastening the bracket 3 at a location below the side roof rail 12 as mentioned above, it is possible to suppress the relative displacement of the airbag main body 2 and the pillar trim 14 in the event of a side collision. More particularly, in the present embodiment, the mounting point P is set at a location below a flange portion (lower end portion) 12*c* (illustrated in phantom in FIG. 1) of the side roof rail 12. This is because above the flange portion 12*c*, the inner panel 10*b* of the center pillar 10 is overlapped and integrated with the side roof rail 12 to constitute the first side member with a high stiffness, but below the flange portion 12*c*, the inner panel 10*b* of the center pillar 10 is not overlapped with the side roof rail 12 to constitute the second side member with a relatively low stiffness such that the center pillar 10 moves together with the pillar trim 14 as the third side member in the event of a side collision.

By fastening the bracket 3 on the inner panel 10*b* at a location below the flange portion 12*c*, it is possible to further suppress the relative displacement of the airbag main body 2 and the pillar trim 14 and hence prevent the airbag 1 from being obstructed during its inflation. Further, in the direction of the width of the vehicle (the horizontal direction in FIG. 1), the airbag main body 2 is disposed farther inwardly into the vehicle compartment than the upper end of the pillar trim 14. Accordingly, it is therefore possible to surely prevent the pillar trim 14 and the airbag main body 2 from interfering with each other when the airbag 1 is inflating. Specifically, a vehicle compartment outer-side surface 2*a* of the airbag main body 2 is disposed farther inward in the vehicle compartment than a vehicle compartment inner-side surface 14*a* of the upper end of the pillar trim 14.

With the above described arrangement of the occupant protective arrangement according to the embodiment of the present invention, in the event of a side collision, both the center pillar 10 and the trim panel 14 move inward in the vehicle compartment in response to an impact of the collision, (refer to two-dot dash lines in FIG. 1). Further, the airbag main body 2 is rapidly inflated to spread out from the space between the pillar trim 14 and the head lining 15. Since the mounting point P of bracket 3 that fastens the airbag main body 2 to the vehicle body 20 is set at a location with a relatively low stiffness in the inner panel 10*b* of the center pillar 10 (the second side member), and more specifically, the mounting point P is set at a location lower than the lower-end flange portion 12*c* of the side roof rail 12, the bracket 3 moves while maintaining the relative positional relation with the pillar trim 14, thus suppressing the relative displacement of the airbag main body 2 and the pillar trim 14. As a result, it is possible to prevent the pillar trim 14 from entering the inflating range of the airbag 1, and hence reliably prevent the airbag and the pillar trim from interfering with each other.

Further, with the arrangement in which the airbag main body 2 is disposed farther inward in the vehicle compartment than the upper end of the pillar trim 14, even if the pillar trim 14 moves inwardly in the vehicle compartment to a greater extent than the inner pillar 10*b*, it is possible to reliably prevent the airbag 1 and the pillar trim 14 from interfering with each other.

Further, according to the present invention, it is possible to eliminate the necessity of adding new parts and the like, and to avoid an increase in cost and time required for assembly.

Although the present invention has been described in some detail by way of illustration for purposes of clarity of understanding, it will be apparent that certain changes and modifications may be practiced within the scope of the claims. Such modifications and variations that may be apparent to a person skilled in the art are intended to be within the scope of this invention. For example, although in the above-described embodiment, the inner panel 10*b* of the center pillar 10 is applied as the pillar panel, the present invention is not limited to this particular arrangement, but either a front pillar or a rear pillar can be applied as the pillar panel.

What is claimed is:

1. An occupant protective arrangement for a vehicle, comprising:

a side roof panel constituting an upper part of a side of a vehicle body;

a pillar panel extending below said side root panel;

a pillar trim covering said pillar panel;

an airbag for inflating and spreading into a vehicle compartment, said airbag being fixed to said pillar panel and disposed above said pillar trim; and a bracket having a holding part that holds said airbag and a mounting part mounted to said pillar panel, wherein the mounting part is positioned below a lower end of said said roof panel.

2. An occupant protective arrangement for a vehicle according to claim 1, wherein said airbag is disposed farther inwardly in the vehicle compartment than an upper end of said pillar trim.

3. An occupant protective arrangement for a vehicle according to claim 2, wherein an outer-side surface of said airbag is disposed farther inwardly in the vehicle compartment than an inner-side surface of the upper end of said pillar trim.

4. An occupant protective arrangement for a vehicle according to claim 1, wherein one end of said pillar panel comprises an overlapping part that overlaps said said roof panel, and a lower end edge of said side roof panel is located below the overlapping part.

5. An occupant protective arrangement for a vehicle according to claim 1, wherein said pillar panel comprises an outer pillar panel disposed on an outer side of the vehicle compartment and an inner pillar panel disposed on an inner side of the vehicle compartment, and said bracket is mounted on said inner pillar panel.

6. An occupant protective arrangement for a vehicle according to claim 1, wherein said airbag is positioned above said mounting part.

7. An occupant protective arrangement for a vehicle, comprising:

a first side member constituting an upper part of a side of a vehicle;

a second side member extending below said first side member and having a lower stiffness than said first side member;

a third side member disposed farther inwardly in a vehicle compartment than said second side member, and covering said second side member; and an airbag for inflating and spreading into the vehicle compartment, said airbag being disposed farther inwardly in the vehicle compartment than said first side member and located above said third side member, wherein said airbag is fixed to said second side member, such that a relative positional relation between said airbag and said third side member is substantially maintained while said second side member is deformed inwardly in the vehicle compartment.

8. An occupant protective arrangement for a vehicle according to claim 7, further including a bracket having a holding part that holds said airbag and a mounting part mounted to said second side member.

9. An occupant protective arrangement for a vehicle according to claim 8, wherein said airbag is positioned above said mounting part.

10. A vehicle comprising:

a first side member constituting an upper part of a side of a vehicle;

a second side member extending below the first side member;

a third side member covering the second side member; and an airbag for inflating and spreading into the vehicle compartment, the airbag being fixed to the second side member and disposed above the third side member; and a bracket having a holding part that holds the airbag and a mounting part mounted to the second side member, wherein the mounting part is positioned below a lower end of the first side member.

11. A vehicle according to claim 10, wherein the airbag is dispose farther inwardly in a vehicle compartment than the first side member and located above the third side member.

12. A vehicle according to claim 10, wherein the airbag is positioned so that a relative positional relation between the airbag and the third side member is substantially maintained while the second side member is deformed inwardly in the vehicle compartment.

* * * * *